June 15, 1965  N. TETLOW  3,188,966
ROTODYNAMIC VOLUTE MACHINES
Filed Jan. 31, 1962  12 Sheets-Sheet 1
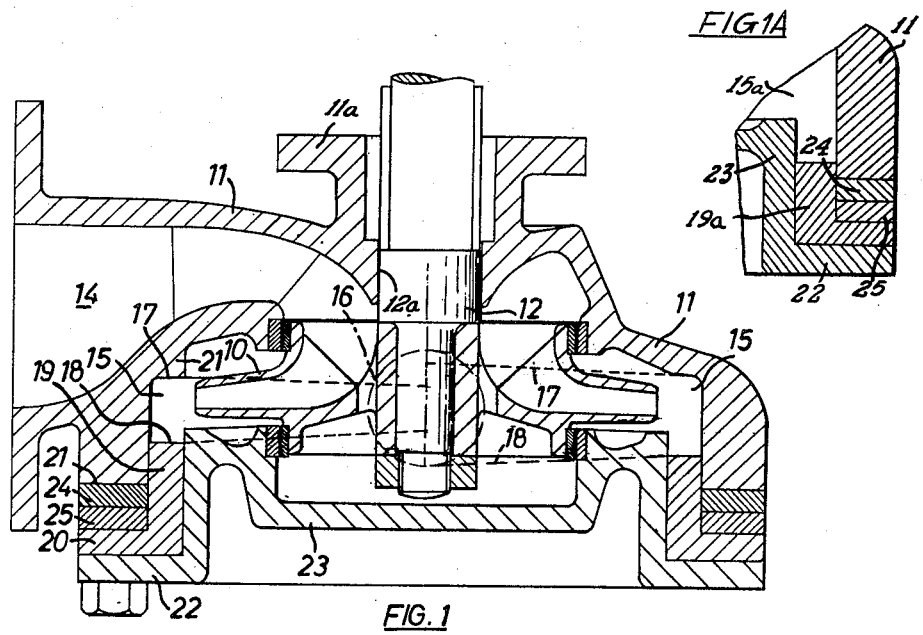
FIG. 1A
FIG. 1
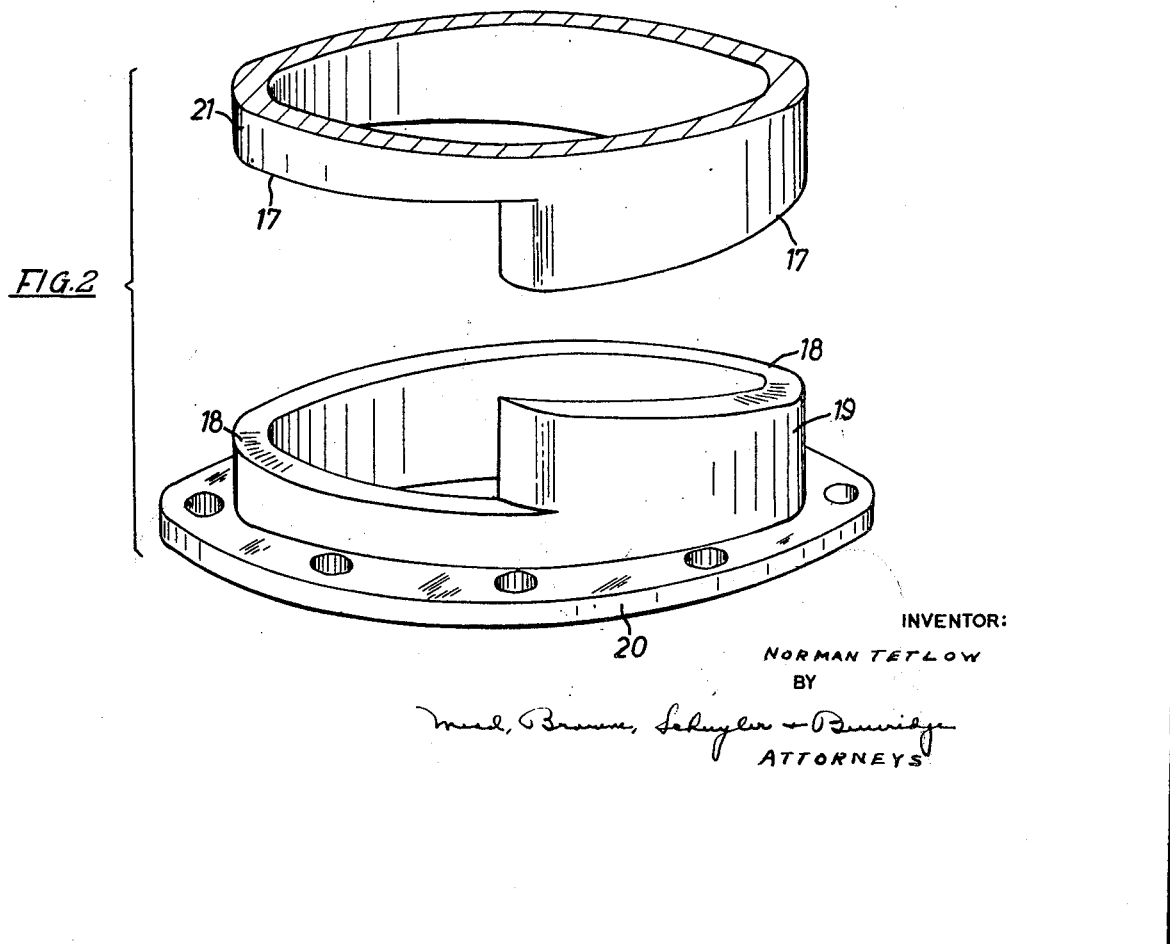
FIG. 2
INVENTOR:
NORMAN TETLOW
BY
ATTORNEYS

INVENTOR:
NORMAN TETLOW
BY
ATTORNEYS

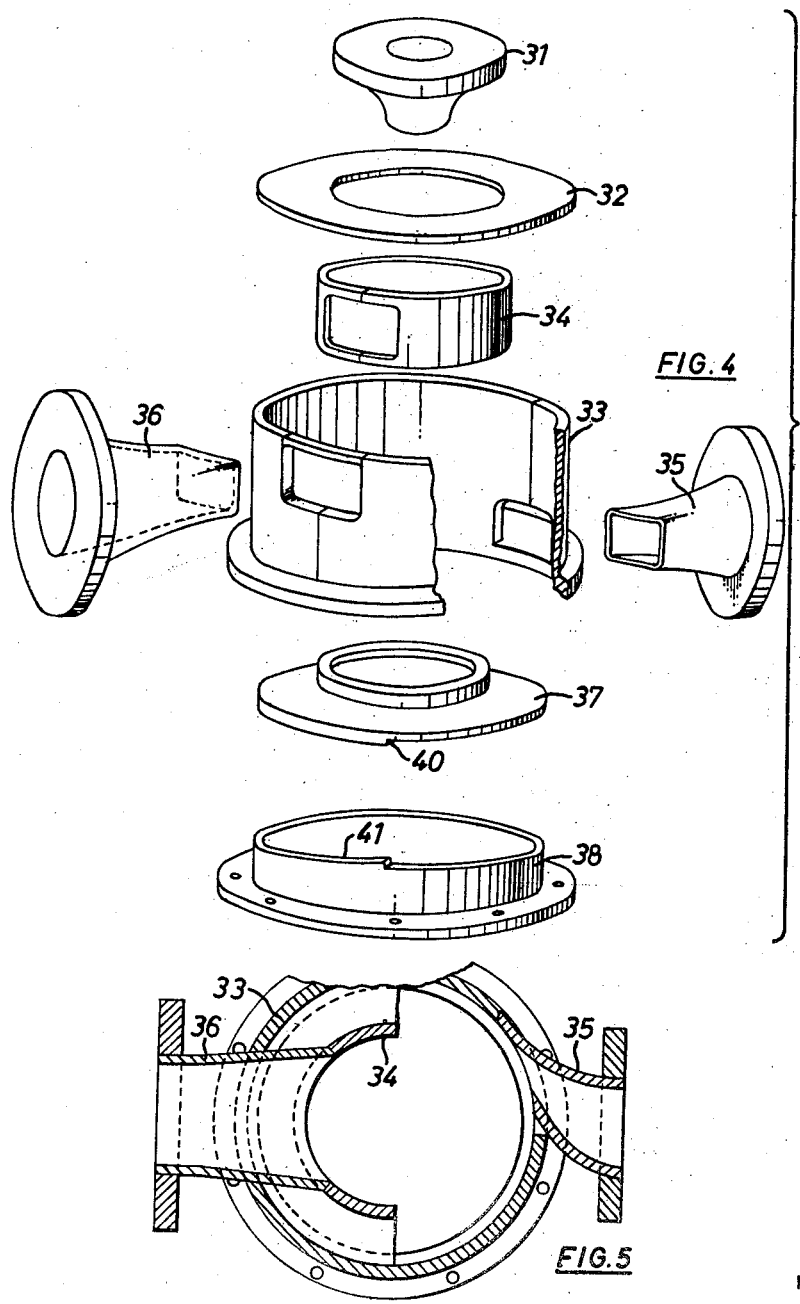

June 15, 1965   N. TETLOW   3,188,966
ROTODYNAMIC VOLUTE MACHINES
Filed Jan. 31, 1962   12 Sheets-Sheet 6

INVENTOR:
NORMAN TETLOW
BY
Mead, Browne, Schuyler + Burridge
ATTORNEYS

June 15, 1965 N. TETLOW 3,188,966
ROTODYNAMIC VOLUTE MACHINES
Filed Jan. 31, 1962 12 Sheets-Sheet 8

INVENTOR:
NORMAN TETLOW
BY
ATTORNEYS

June 15, 1965 N. TETLOW 3,188,966
ROTODYNAMIC VOLUTE MACHINES
Filed Jan. 31, 1962 12 Sheets-Sheet 9

INVENTOR:
NORMAN TETLOW
BY
Mead, Browne, Schuyler + Burridge
ATTORNEYS

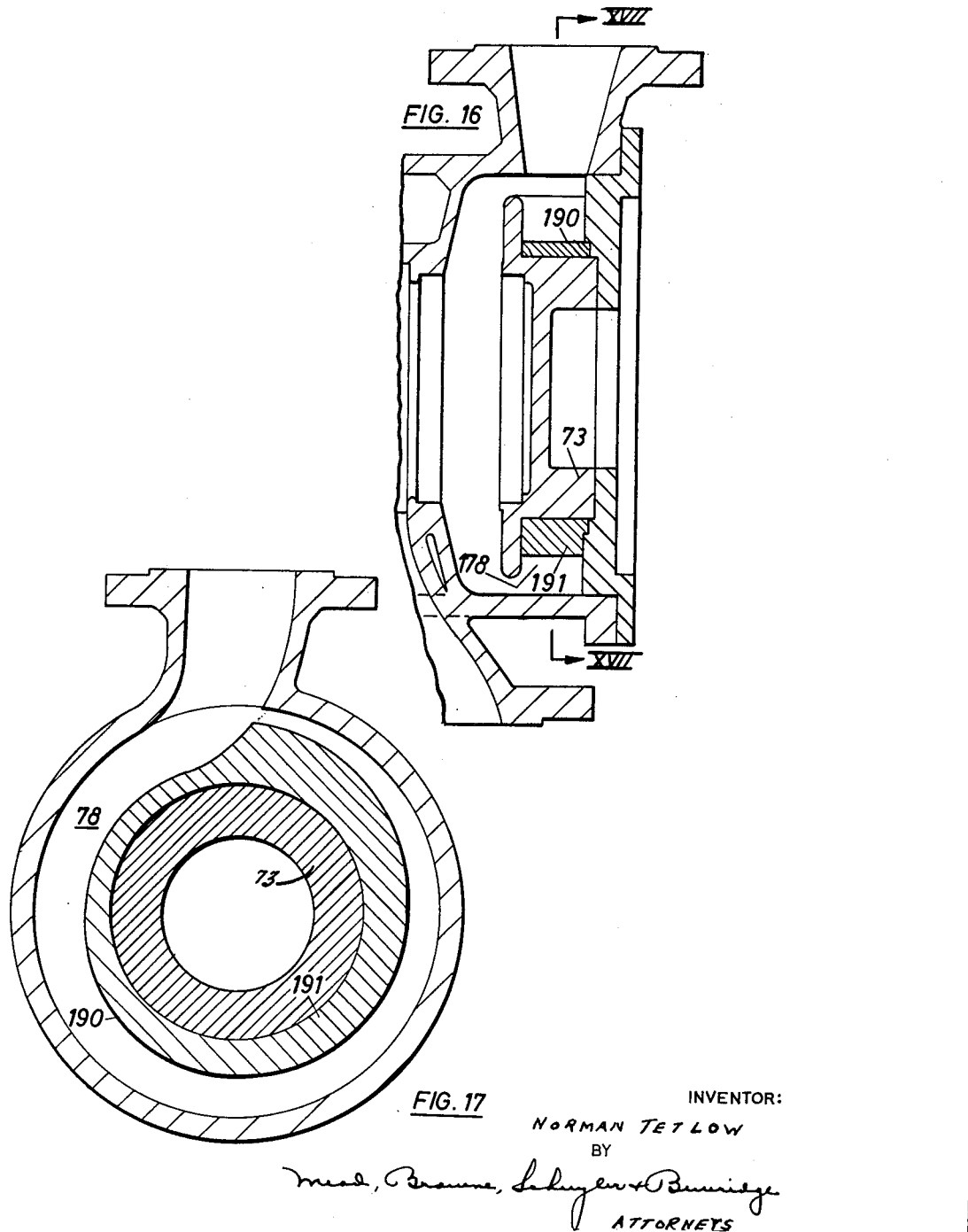

June 15, 1965  N. TETLOW  3,188,966
ROTODYNAMIC VOLUTE MACHINES
Filed Jan. 31, 1962  12 Sheets-Sheet 11

INVENTOR:
NORMAN TETLOW
BY
ATTORNEYS

June 15, 1965   N. TETLOW   3,188,966
ROTODYNAMIC VOLUTE MACHINES
Filed Jan. 31, 1962   12 Sheets-Sheet 12

INVENTOR:
NORMAN TETLOW
BY
ATTORNEYS

United States Patent Office 3,188,966
Patented June 15, 1965

3,188,966
ROTODYNAMIC VOLUTE MACHINES
Norman Tetlow, "Windlehurst Cottage," High Lane, near Stockport, England
Filed Jan. 31, 1962, Ser. No. 170,105
Claims priority, application Great Britain, Feb. 2, 1961, 3,960/61; Apr. 6, 1961, 12,352/61; June 15, 1961, 21,577/61; Sept. 9, 1961, 32,438/61
11 Claims. (Cl. 103—103)

The present invention relates to rotodynamic machines for converting mechanical energy into fluid pressure and/or velocity energy or vice versa such as for example centrifugal pumps, compressors and turbines of the kind in which fluid after leaving or when approaching an impeller flows along a passage of gradually increasing or decreasing cross sectional area where velocity energy is converted into pressure energy or vice versa. When the machine has a single inlet or outlet the said passage usually extends substantially completely around the axis of the machine but if in the case of a pump there are two outlets or in the case of a turbine there are two inlets there may be two such passages each extending approximately halfway round the axis of the machine. Examples of such machines are centrifugal pumps commonly referred to as volute pumps, gas compressors of the radial outward flow type, and hydraulic, steam, gas or air driven turbines of the radial inward flow type or of the mixed flow type. For the sake of convenience such machines will hereinafter and in the appended claims be generically referred to as rotodynamic volute machines and the aforesaid passage which is of circumferentially varying cross sectional area will be referred to as a volute passage.

The object of the present invention is to provide rotodynamic volute machines which can be manufactured relatively inexpensively and which can be inexpensively modified to suit different duties.

According to the present invention a rotodynamic volute machine comprises a rotor casing with a member inserted therein having a surface which serves as a boundary wall of a volute passage in the casing and which is shaped to give rise to circumferentially occurring variation in the cross sectional area of the volute passage.

According to another aspect of the invention a rotodynamic volute machine comprises a rotor casing containing a volute passage whose end of larger cross sectional area leads to a port in the casing and the circumferentially occurring variation of whose cross sectional area results at least in part from a boundary wall formed on a member inserted in the casing.

According to a further aspect of the invention a rotodynamic volute machine comprises a rotor casing having an open ended cylindrical bore therein substantially concentric with the rotational axis of the machine and containing a volute passage the circumferentially occurring variation of whose cross sectional area results at least in part from a boundary wall formed on a member inserted in said bore.

According to a still further aspect of the invention a rotodynamic volute machine comprises a rotor casing having an open ended cylindrical bore therein substantially concentric with the rotational axis of the machine and containing a volute passage whose end of larger cross sectional area leads to a port in the casing and the circumferentially occurring variation of whose cross sectional area results at least in part from a boundary wall formed on a member inserted in said bore.

The expression "substantially concentric" when used herein is to be taken to include concentricity and small degrees of eccentricity insufficient materially to impair the working or efficiency of the machine, for example of the order of one eighth of an inch to one quarter of an inch in a diameter of nine inches.

According to a further feature of the invention a rotodynamic machine comprises a casing with a volute passage therein extending around the rotational axis of the machine in which the circumferentially occurring variation in the cross sectional area of the volute passage results primarily or exclusively from variation in its axial depth and in which an axially facing wall of the volute passage shaped to result in circumferentially occurring variation in the cross sectional area of the volute passage is formed on a member inserted in the casing.

When the variation in the cross sectional area of the volute passage results exclusively from variation in its axial depth the volute passage is preferably substantially concentric with the axis of rotation of the machine.

The fact that the circumferentially occurring variation of the cross sectional area of the volute passage within the rotor casing can be achieved according to the present invention partly or wholly by means of a boundary wall on a member inserted in the casing enables the internal shape of the casing to be simplified and renders it capable of being manufactured relatively inexpensively. In many cases the casing can be cylindrical and can be fabricated by welding. The said member may be inserted in the casing and permanently fixed in position but it is preferably adjustable or detachable to enable the volume of the volute passage to be altered to enable a given machine casing and rotor to perform a range of different duties without serious loss of efficiency.

The invention thus includes the concept of altering the performance of a rotodynamic volute machine by changing the volume of the volute passage and in particular by altering the axial spacing of the axially opposite faces of the volute passage.

The advantage of the present invention from the point of view of minimising loss of efficiency in the use of the same machine at different rates of performance is approximately the same as would result from using alternative machine casings with volute passages of different volumes but is achieved at a considerably lower capital outlay since the cost of an alternative inserted member is considerably less than that of an alternative casing and the saving of capital cost is even greater when an inserted member is arranged to be adjustable in position to change the volume of the volute passage. Further, in the present invention this change of volume of the volute passage can often be effected without the need for disconnection of the machine from its inlet and discharge pipe lines.

The invention is particularly applicable to centrifugal pumps for use in chemical and petro-chemical processes where it is highly desirable to achieve as high a degree of standardization and interchangeability as is reasonably possible and where the invention enables a given pump to serve a range of different duties or alternatively when installed to function at different rates of output without undue reduction in efficiency.

The invention will be further described by way of example with reference to volute pumps as illustrated in the accompanying drawings in which:

FIG. 1 is a diagrammatic axial sectional view illustrating a volute pump according to the invention;

FIG. 1A is a detail section to illustrate a modification of the insert ring of the pump of FIG. 1;

FIG. 2 is a diagrammatic perspective view more or less corresponding to FIG. 1 to illustrate the insert ring and the relative dispositions of the axially opposed faces of the volute passage;

Figure 3:
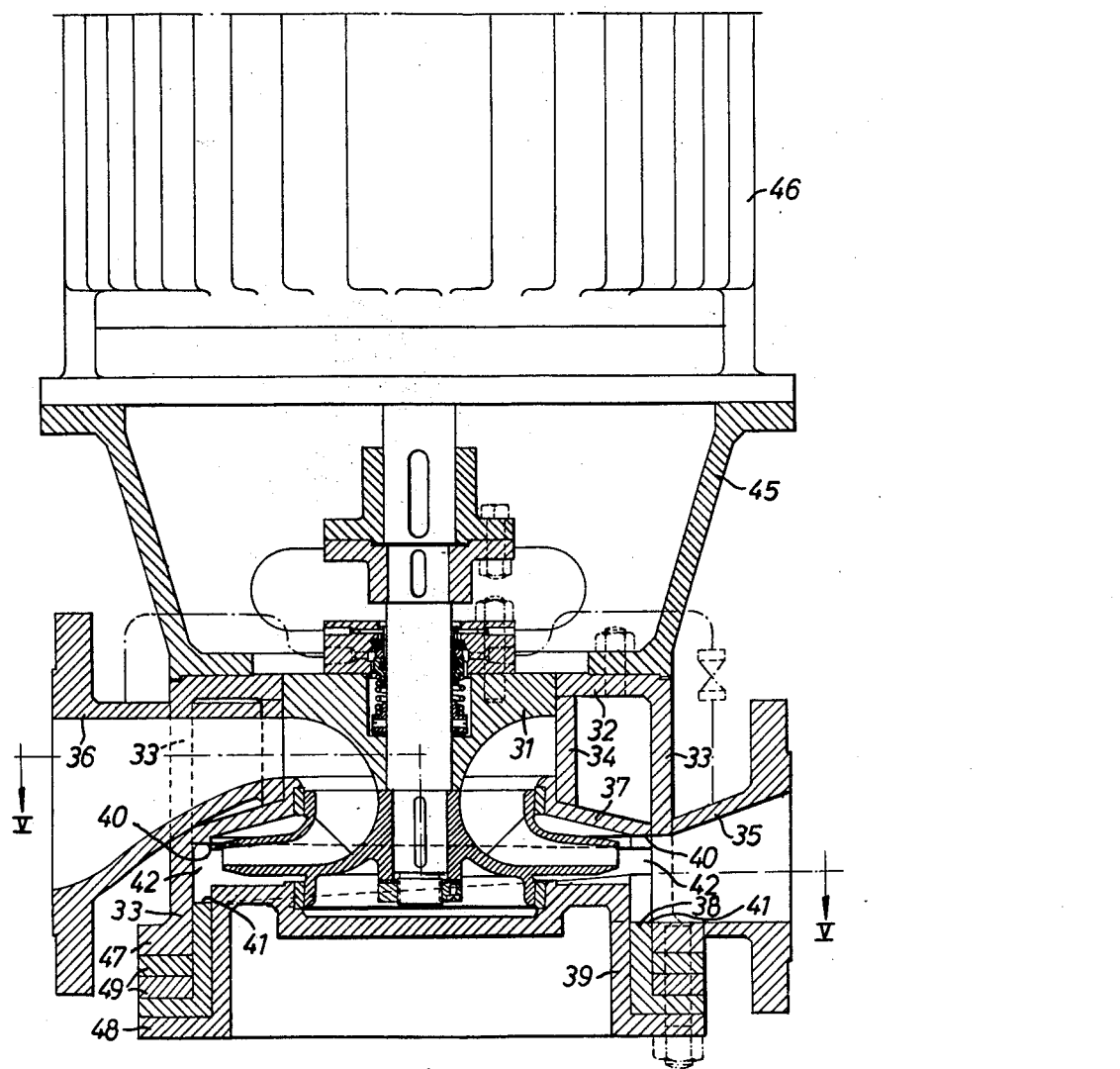
FIG. 3 is an axial sectional view of a volute pump of fabricated construction.
Figure 6:
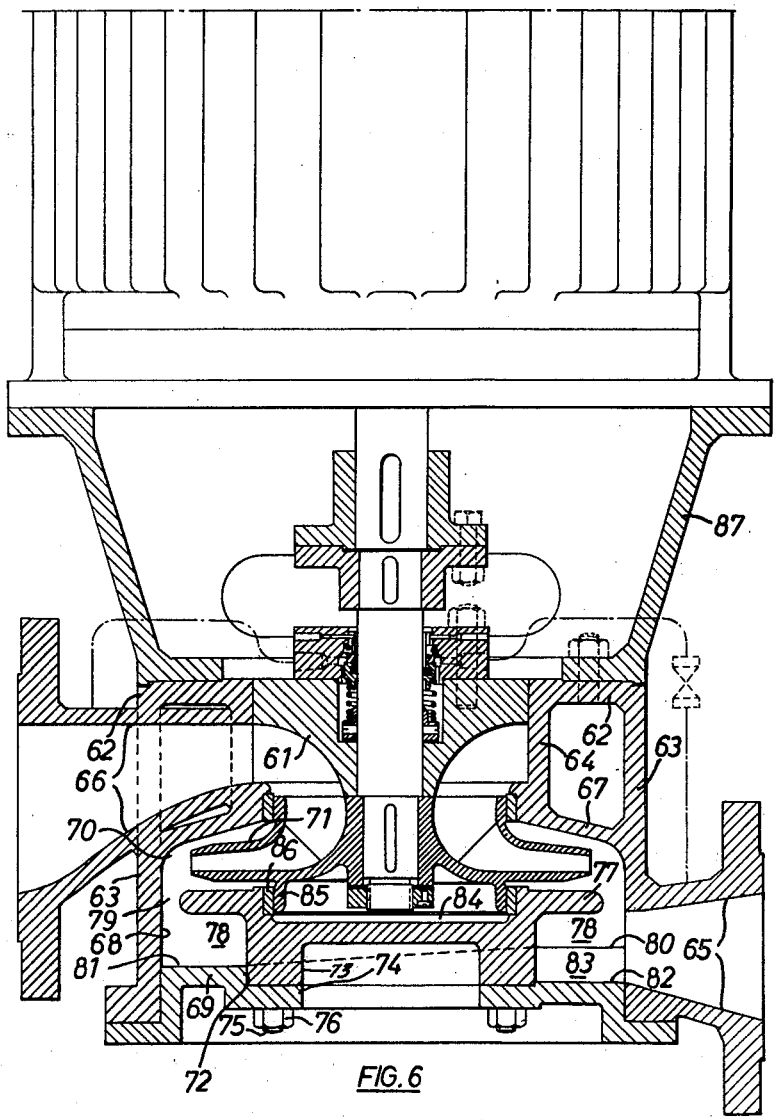
Figure 14:
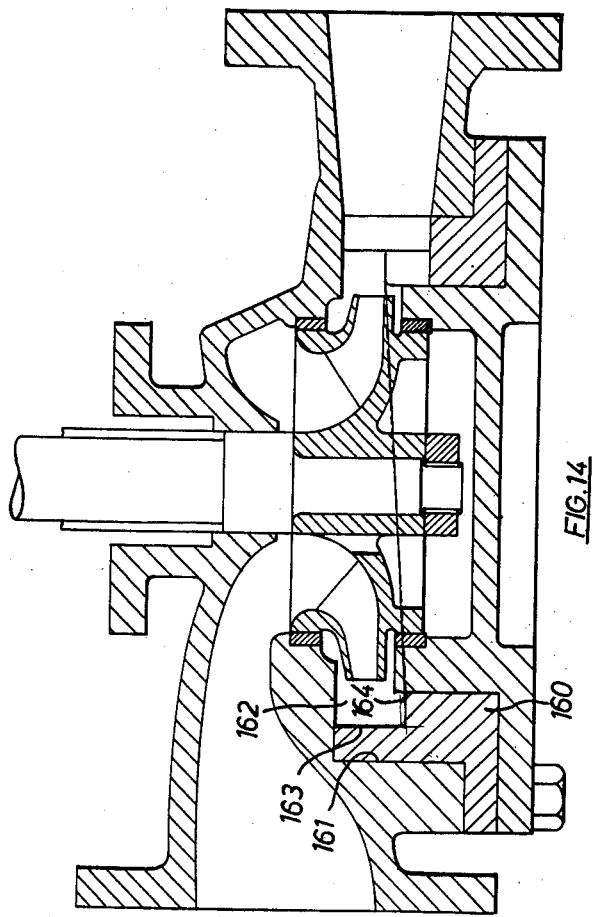
Figure 15:
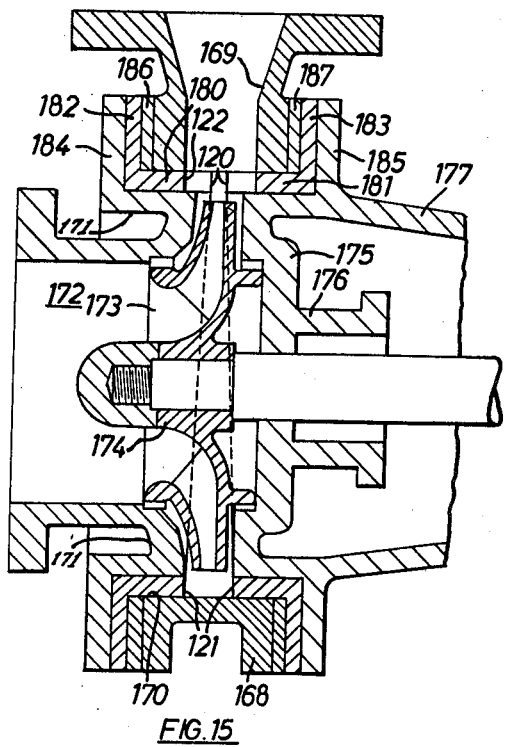
Figure 18:
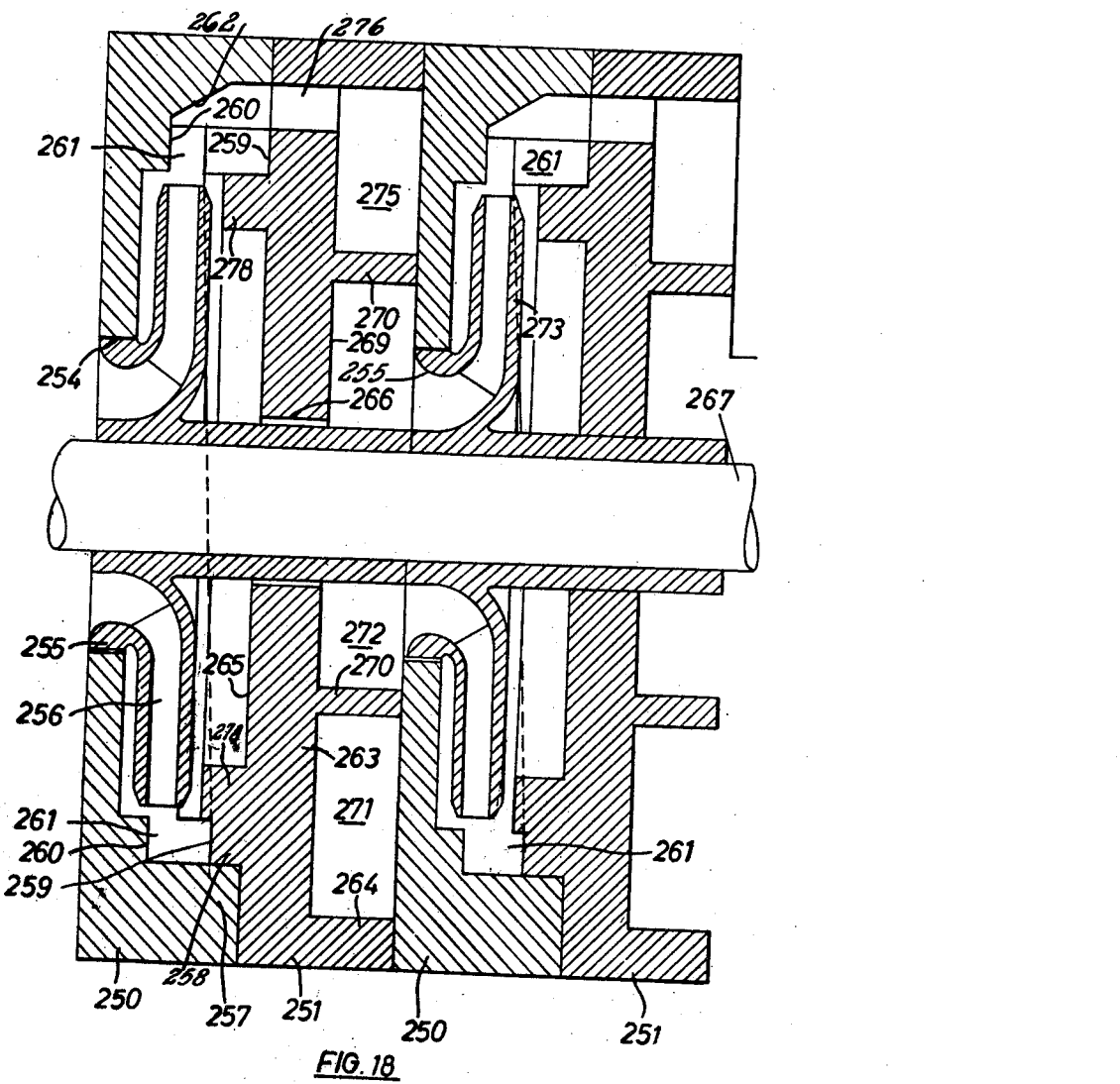
Figure 21:
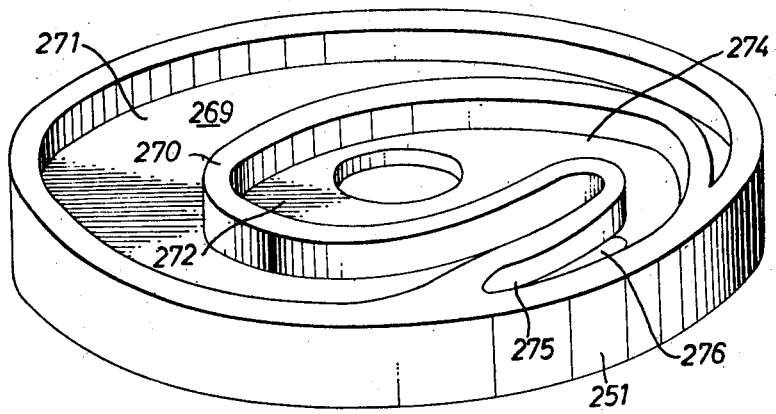
Figure 20:
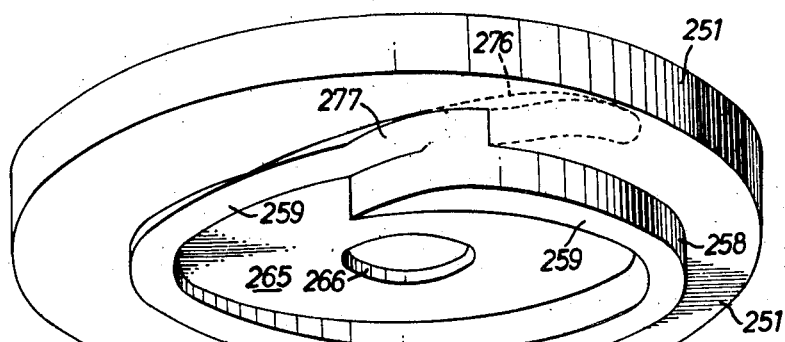
Figure 19:
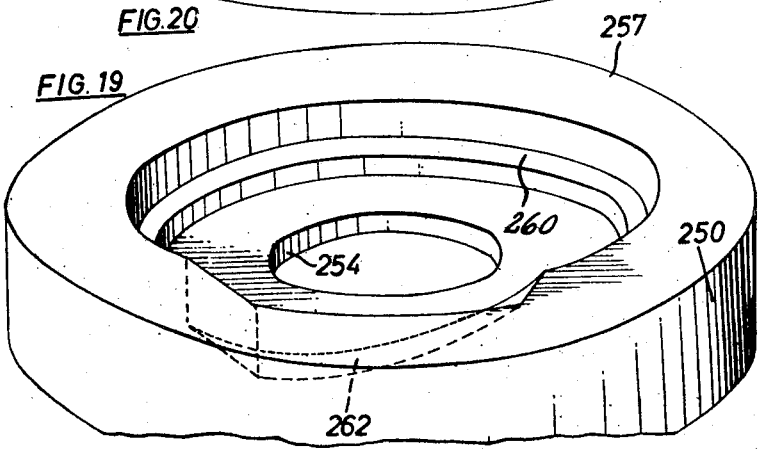

FIG. 4 diagrammatically illustrates a number of parts from which the pump in FIG. 3 could be fabricated;

FIG. 5 is a somewhat diagrammatic sectional view on the line V—V of FIG. 3 of a volute pump casing to illustrate the interrelationship of the parts illustrated in FIG. 4 when the casing is assembled from these parts;

FIG. 6 is an axial sectional view of another form of volute pump according to the present invention in which the volute passage is axially spaced from and communicates with the rotor through a transfer passage in the pump casing;

FIGS. 7 to 13 are fragmentary axial sectional views illustrating alternative forms of pump casings similar in character to that illustrated in FIG. 6;

FIGS. 14 and 15 are axial sectional views illustrating two further forms of volute pump;

FIGS. 16 and 17 are respectively an axial sectional view and a sectional view taken on the line XVII—XVII in FIG. 16 illustrating a pump casing in which the volute passage is of varying radial width and constant axial depth;

FIG. 18 is a diagrammatic axial sectional vew of a multi-stage volute pump according to the present invention;

FIG. 19 is a diagrammatic perspective view illustrating one of the casing members of FIG. 18;

FIG. 20 is a diagrammatic perspective view illustrating one side of another of the casing members of FIG. 18; and FIG. 21 is a perspective view illustrating the other side of the casing member shown in FIG. 20.

FIG. 1 illustrates a volute pump impeller 10 housed in pump casing 11 and rotated by a shaft 12 on which it is mounted. The shaft 12 is journalled in a bearing 12a in the casing 11 and is driven by a motor (not shown in FIG. 1) mounted on a flange 11a of the casing. Fluid fed to the eye of the impeller 10 through an inlet passage 14 is discharged by the impeller into a volute passage 15 from which it passes into a delivery passage through a discharge port 16 indicated by a dotted circle in FIG. 1.

The volute passage 15 is of constant radial width and of gradually increasing axial depth proceeding in the circumferential direction around the casing. It is axially bounded by axially opposed faces 17, 18 respectively of the casing 11 and of the inner end of an insert ring 19 which at its outer end has an outwardly directed flange 20. The shape of the face 18 of the insert ring 19 is illustrated in perspective in FIG. 2 and to illustrate its relationship with its opposing axial face 17 of the casing an annular portion 21 of the casing 11 (which in fact is an integral part of the casing 11) is shown in FIG. 2. From FIG. 2 it will be seen that proceeding in the circumferential direction the axial spacing between the faces 17 and 18 gradually increases in a counter clockwise direction which corresponds to the direction of rotation of the impeller 10. In FIG. 1 the broken lines 17, 18 which diverge from left to right indicate the faces 17, 18 as they pass in front of the axis of the pump and the broken lines 17, 18 which diverge from right to left indicate the faces 17, 18 as they pass behind the pump axis towards the port 16.

The flange 20 of the insert ring 19 lies between the face 21 of the casing and the flange 22 of the pump cover 23 and is spaced from the face 21 by two spacing rings or shims 24, 25.

When the insert ring 19 is in the position shown in FIG. 1 the volute passage 15 is at its maximum volume. The volume of the volute passage can be reduced by withdrawing the pump cover 23 and the insert ring 19 and reassembling them with the flange 20 next to the spacing ring 24 and with the spacing ring 25 between the flange 20 and the flange 22 of the cover 23. The volume of the volute passage can be reduced to a minimum by assembling the insert ring 19 so that its flange 20 is immediately adjacent the face 17 of the casing 10 with both of the spacing rings 24, 25 between the flange 20 of the insert ring and flange 22 of the cover 23. Intermediate adjustments in the position of the insert ring 19 can be made by the employment of thinner spacing rings.

Alternatively, as illustrated in FIG. 1A, the volume of the volute passage 15a may be altered by withdrawing the insert ring 19 and replacing it by an alternative insert ring 19a of different axial dimensions.

The pump casing illustrated in FIG. 3 is fabricated from a number of casing parts substantially as illustrated in FIG. 4 and comprises a stuffing-box housing 31, a top plate 32, an axially extending outer casing wall 33, an axially extending inner casing wall 34, a discharge duct 35, an inlet duct 36, a connecting wall 37 extending from the outer wall 33 to the inner wall 34, a flanged insert ring 38 and an end cover 39. The end cover 39 is not illustrated in FIG. 4. The pump casing as illustrated in FIG. 3 is fabricated by welding together the parts 31, 32, 33, 34, 35, 36 and 37. The parts 37 and 38 are formed with oppositely inclined helical surfaces or scrolls 40, 41 which serve as axially opposite boundary walls of the volute passage and which provide a volute passage of constant radial width and of increasing axial depth. In other words, the scrolls 40, 41 provide a passage 42 therebetween which is concentric about the axis of the pump but nevertheless of volute form in the sense that it is of progressively increasing cross sectional area to enable velocity head to be converted into pressure head. In the construction ilustrated in FIG. 3, a pedestal 45 is mounted on the top plate 32 of the pump casing for the purpose of supporting an electric driving motor 46.

The flange of the insert ring 38 is sandwiched between a flange 47 at the lower end of the outer wall 33 and the flange 48 of the cover 39, and shims 49 are inserted between the flange 47 and the flange of the insert ring 38. At its position as illustrated in FIG. 3, the insert ring 38 provides a volute passage of maximum volume which can however, be reduced by transferring one or both of the shims 49 to the opposite side of the flange of the insert ring 38.

The parts illustrated in FIG. 4 can be made and welded together relatively inexpensively so that pumps according to the present invention can be manufactured at relatively low cost. The casing walls 33, 34 can be made from pipe lengths or by rolling flat metal plate into cylindrical form. Although the casing walls 33, 34 are cylindrical as illustrated in FIGS. 3 and 4, they could be slightly tapered. Although the connecting wall 37 as shown in FIGS. 3 and 4 extends slightly in the axial direction it is essentially a radially extending wall since it must connect the axially extending outer wall 33 with the axially extending inner wall 34.

Figure 3A:
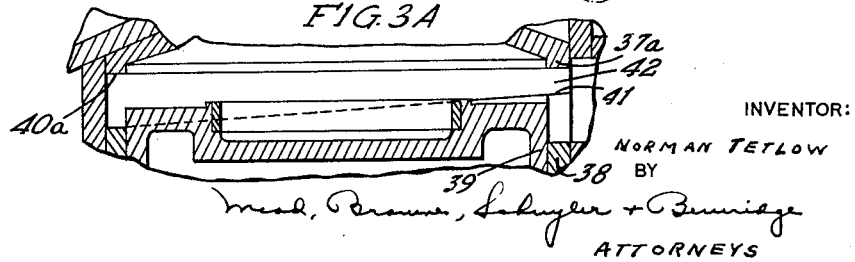
FIG. 3A is a detail section showing a modification of a part of the pump of FIG. 3, the rotor being omitted.

The volute passage 42 of FIG. 3 is bounded at its axially opposite sides by two scrolls, 40, 41, but it is possible to provide a volute passage bounded by a scroll at one side only and by a flat annular surface 40a at its other side, as shown in FIG. 3a.

In the form of construction illustrated in FIG. 6 the pump casing is fabricated from a number of casing parts and comprises a stuffing box housing 61, a top plate 62, an axially extending cylindrical outer casing wall 63, an axially extending cylindrical inner casing wall 64, a discharge duct 65, an inlet duct 66 and a connecting wall 67 extending from the outer wall 63 to the inner wall 64, these members being integrally secured together by welding. The casing is thus formed with an axially directed cylindrical bore 68 which is open at its lower end where it is closed by a cover 69 and leads at its inner end to an annular flow chamber 70 (or rotor chamber) concentric with and surrounding the rotor 71. The cover 69 is formed with an internal central recess 72 to receive a spigot at the lower end of a boss 73 which is axially inwardly directed from the cover 69 into the bore 68 of the casing. In the form of construction shown the boss 73 closes a central opening 74 in the cover and is detachable from the cover being secured thereto by studs 75 and nuts 76. At its inner end the boss 73 has a flange 77. In the form of construction shown the flange 77 extends outwardly from the boss in a radial direction but the boss could if desired be somewhat inclined to the radial direction. The flange 77 separates the flow or rotor chamber 70 from a volute passage 78 which is axially spaced from the flow chamber 70. The periphery of the flange 77 together with the surface of the bore 68 of the casing defines a transfer passage 79 by which the flow chamber 70 communicates with the volute passage 78 which in turn communicates with the discharge duct 65.

The circumferentially increasing cross-sectional area of the volute passage 78 results from a scroll-like contoured surface 81 on the inner face of the cover 69, a step 83 between the axially spaced ends 80, 82 of the scroll-like contoured surface 81 defining the position of the cut-water. The contoured surface 81 slopes circumferentially and axially over approximately 180° from one level at the end 80 to an intermediate level, as seen at the left of the figure and continues for a further 180° from this intermediate level to a further level at the end 82.

The inner face of the boss 73 directed away from the cover is formed with a recess 84 to receive an axially directed spigot 85 on the impeller. The side wall of the recess 84 is lined with a wear ring 86.

The reference numeral 87 indicates a pedestal on which a driving motor can be mounted.

The form of pump casing illustrated in FIG. 6 lends itself to relatively inexpensive manufacture by fabrication and welding. This is largely because the outer casing wall 63 is cylindrical or in other words because the casing is formed with an open-ended axially directed cylindrical bore leading to the impeller space.

As compared with the pump illustrated in FIGS. 1 and 2 that of FIG. 6 has a volute passage 78 which is axially spaced from the flow chamber 70 of the rotor and in communication therewith through an annular transfer passage 79 therebetween. In this form of construction fluid is discharged from the rotor into the concentric annular flow chamber 70 and from thence it flows substantially helically through the transfer passage 79 into the volute passage 78 and finally to the discharge duct 65. The concentric annular flow or rotor chamber 70 and transfer passage 79 greatly help to ensure a uniform distribution of pressure around the rotor and to avoid radial thrust on the rotor shaft. The invention embodied in FIG. 6 furthermore leads to the possibility of greatly enlarging the volume of the volute passage without increasing the diameter of the pump casing thereby facilitating the design and manufacture of pumps of high specific speed.

Figure 7:
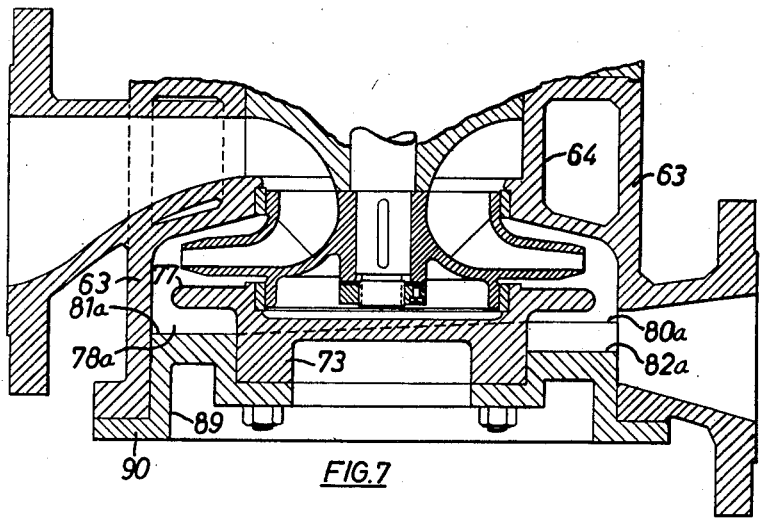

The pump casing illustrated in FIG. 7 is exactly the same as that of FIG. 6 except that the cover 69 has been exchanged for a differently shaped cover 89 in order to reduce the volume of the volute passage 78a, the contoured surface 81a, extending from its end 80a, to its end 82a of the cover 89 being nearer to the flange 77 of the boss 73. Thus to change the pump cover is one mode of changing the volume of the volute passage.

Figure 8:
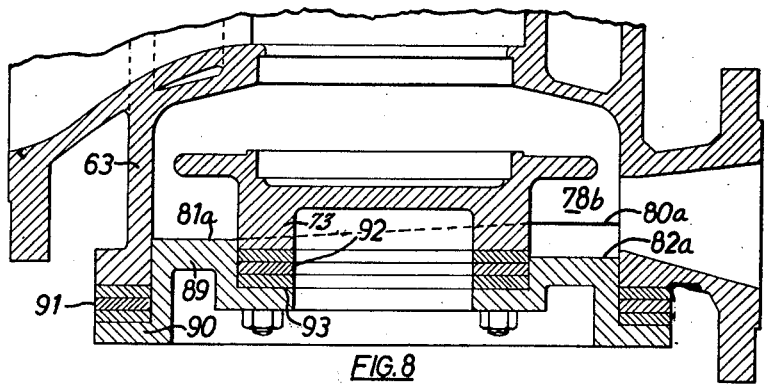

Another mode of changing the volume of the volute passage 78b is illustrated in FIG. 8 where spacing rings 91 are inserted between the end of the cylindrical casing wall 63 and the flange 90 of the cover 89 and spacing rings 92 of equal thickness are inserted between the boss 73 and its seating 93 on the cover 89. In this way the volume of the volute passage 78b is increased as compared with that illustrated in FIG. 7 without the necessity of using an alternative cover. The volute passage 78b may be further increased in volume or reduced in volume by inserting or withdrawing rings 91 and 92.

Figure 9:
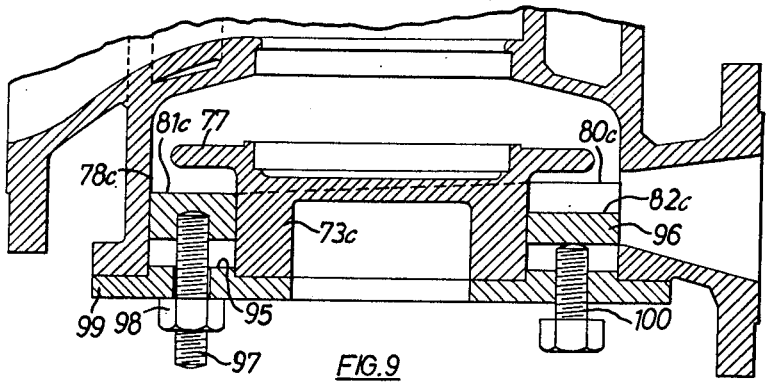

FIG. 9 illustrates a third mode of altering the volume of the volute passage 78c. In this case the inner face 95 of the cover 99 is flat, the volute passage being bounded by an annular member 96 which extends across the width of the volute passage 78c and is secured to the cover by studs and nuts 97, 98 and is adjustable as to its spacing from the cover and thus as to its spacing from the flange 77 of the boss 73c by means of set bolts 100 threaded through the cover 99. The member 96 has a scroll-like contoured surface 81c, extending helically from end 80c to end 82c, corresponding to that of cover 69 and 89.

Figure 10:
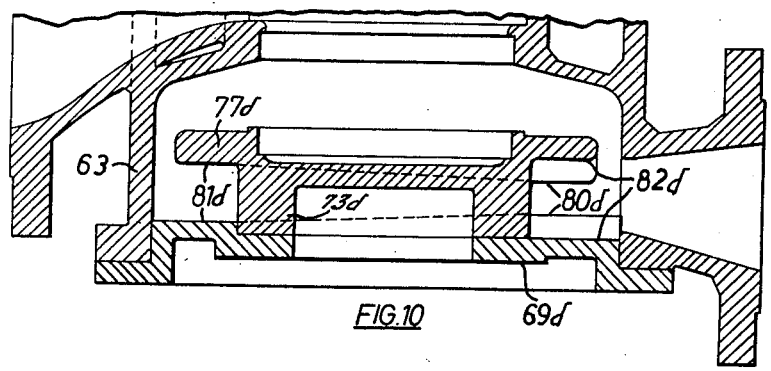

The construction according to FIG. 10 is similar to that of FIG. 6 except that a scroll-like contoured surface 81d, extending helically from end 80d to end 82d, is provided not only on the inner face of the cover 69d but also on the outer face of the flange 77d of the boss 73d.

Figure 11:
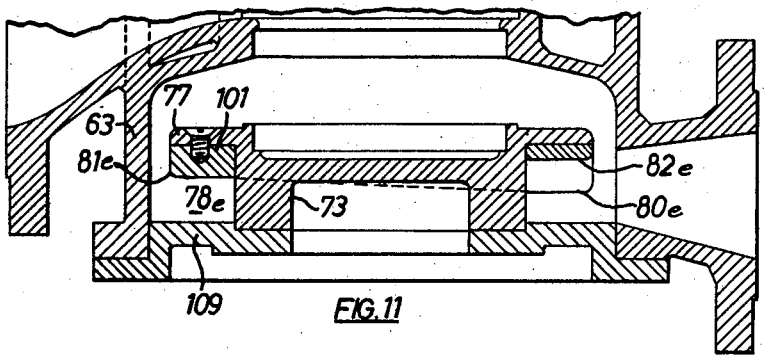

The arrangement according to FIG. 11 is similar to that of FIG. 6 except that the increasing cross sectional area of the volute passage 78 results from a scroll-like contoured surface 81e, extending helically from end 80e to end 82e, on an annular member 101 secured to the outer face of the flange 77 of the boss 73, the inner face of the cover 109 being flat.

Figure 12:
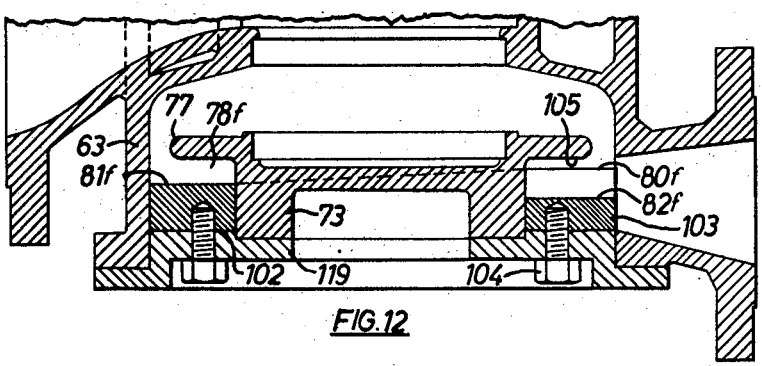

In the arrangement illustrated in FIG. 12 the inner face 102 of the cover 119 is again flat and the increasing cross sectional area of the volute passage 78f is achieved by a scroll-like contoured surface 81f, extending helically from end 80f to end 82f on an annular member 103 secured to the inner face of the cover 119 by set bolts 104. The outer face 105 of the flange 77 is not contoured.

Figure 13:
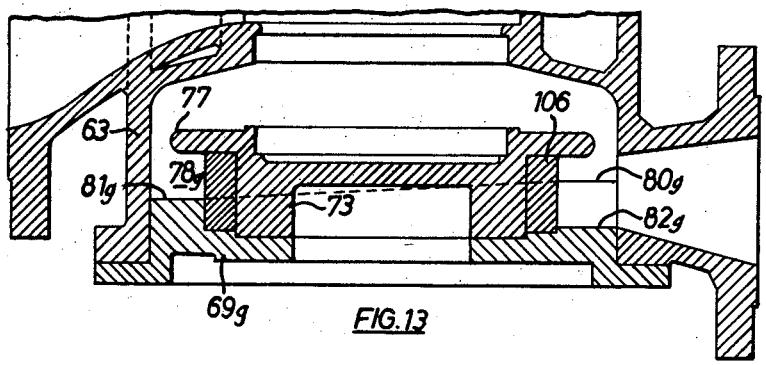

The arrangement shown in FIG. 13 is similar to that of FIG. 6 except that in order to reduce the volume of the volute passage 78g there is provided an annular space filling member 106 fitting on and surrounding the boss 73 between the flange 77 and the cover 69g, the cover having been suitably recessed to receive the member 106 with a corresponding reduction in the radial width of the contoured surface 81g extending helically from end 80g to end 82g.

The form of construction illustrated in FIG. 14 is substantially similar to that illustrated in FIG. 1 except that the insert ring 160 extends axially to the inner end of a cylindrical bore 161 in which it is received and is formed with a recess 162 which constitutes the volute passage and which is bounded by a cylindrical side wall 163 and a scroll-like or helical end wall 164. The volute passage could be enlarged by increasing the diameter of the cylindrical side wall 163. Conversely the volume of the volute passage could be reduced by replacing the insert ring 160 by one in which the side wall 163 is of smaller diameter. The insert ring 160 facilitates the use of rotors of different diameter in a given pump casing, an insert ring with a side wall 163 of smaller diameter being used with a rotor of smaller diameter and vice versa.

In the form of construction illustrated in FIG. 15 the pump casing 168 formed with a discharge duct 169 has an axially directed bore 170 therethrough that is to say a bore which is open at both axially opposite ends of the casing. At its inlet side the casing 168 is closed by a cover 171 which is formed with an inlet passage 172 leading to the inlet eye 173 of the rotor 174. At its opposite end the casing 168 is closed by a cover 175 formed with a gland housing 176 and pedestal or support bracket 177.

Insert rings 180, 181 are provided respectively between the covers 171, 175 and the cylindrical bore 170 of the casing 168. The insert rings 180, 181 have flanges 182, 183 which lie between the casing 168 and the flanges 184, 185 of the covers 171, 175. Spacing rings 186, 187 are inserted between the casing 168 and the flanges 182, 183 of the insert rings 180, 181. The insert rings 180, 181 have scroll-like contoured surfaces 120, 121, 122 at their interfacing ends. These surfaces with the cylindrical bore 170 of the casing 168 serve as boundaries for a volute passage therebetween. The volume of the volute passage can be altered by removing the spacing rings 186/187 or replacing them by spacing rings of different thickness.

FIGS. 16 and 17 illustrate an arrangement similar to that of FIG. 12 except that the circumferentially varying cross sectional area of the volute passage 178 results from a suitably shaped surface 190 formed on a ring member 191 which is inserted into the casing and fits on and surrounds the boss 73. In this form of construction the volute passage 178 is of constant axial depth and its varying cross sectional area results from its varying radial width.

Methods of sealing for pressure tightness of joints etc. are not shown in the drawings but may be of any suitable orthodox form.

In all of the various forms of pump casings hereinbefore described with reference to FIGS. 1 to 17 the casing itself is formed with an axially directed cylindrical bore which is open at at least one end and which leads to or encompasses the rotor space and in which the volute passage is accommodated. In all cases the increasing cross sectional area of the volute passage results from a shaped or contoured surface or surfaces on a member or members inserted in and detachable from the pump casing.

It will be noted that in casings hereinbefore described with reference to FIGS. 1 to 15 the volute passage is of constant radial width and of increasing axial depth and is rectangular in cross section. The flat sided rectangular cross sectional shape of the volute passage gives rise to simplicity of construction. The volute passage could of course be of flat sided trapezoidal shape. Such forms of volute passage where the walls are flat in cross section are usually desirable but the volute passage can be made so that the sides or some of them are not flat in cross section.

FIGS. 18 to 21 illustrate one form of multi-stage volute pump according to the present invention having in each stage a volute passage of constant radial width and of circumferentially increasing axial depth and in which provision is made for communication between the discharge end of the volute passage of each stage with the inlet passage leading to the impeller eye of the succeeding stage.

The casing comprises a series of circular plate-like or radially extending casing members 250 and 251. Each casing member 250 has a central opening therein to provide a neck 254 for the eye 255 of its rotor 256. Each casing member 250 has an axially projecting annular wall 257 to receive an axially directed spigot 258 on the adjacent casing member 251.

The spigot 258 of the casing member 251 is formed with a helically inclined face or scroll 259 facing a flat face 260 on the casing member 250 to provide therebetween a volute passage 261 of constant radial width and of circumferentially increasing axial depth. If desired, the face 260 of the casing member 250 may also be formed as a scroll and the steepness of the scroll 259 may be reduced correspondingly to provide a volute passage of desired character.

The annular wall 257 of casing member 250 is cut away over a portion of its circumferential length as indicated at 262 in FIG. 19.

The casing member 251 comprises a plate 263 with an outer peripheral flange 264. The spigot 258 projects from one side 265 of the wall 263 which has a central opening 266 therein to receive the pump shaft 267. At its opposite side 269 the plate 263 has a sinuous wall 270 projecting axially therefrom to isolate a dead space 271 from a space on the opposite side thereof which comprises an inlet passage 272 leading to the eye 255 of the rotor 256 and an inwardly directed passage 274 whose outer end 275 communicates with a duct 276 which passes through the plate 263 and which extends in an axially inclined or helical manner from the discharge end 277 of the scroll 259 to the outer end 275 of the passage 274. Thus liquid reaching the wider discharge end of the volute passage between the faces 259 and 260 can flow smoothly via the cut-away passage 262 in FIG. 19 through the inclined passage 276 in the plate 263 to the outer end 275 of the passage 274 and then inwardly to the inlet passage 272 of the next stage.

The cut away portion 262 of the annular wall 257 on casing member 250 is located substantially in register with the inlet end of the duct 276 through plate 263 so as to avoid obstruction of the duct 276 by the wall 257.

FIG. 18 illustrates only two stages of a multi-stage pump but any desired number of such stages may be arranged in series, each stage consisting essentially of casing members 250, 251, and rotor 256 or 273.

In FIG. 18 an annular projection 278 is shown forming the inner circumferential boundary wall of the volute passage 261. This has been omitted from FIG. 20 in order to make it possible to show more clearly the scroll 259 and the transfer passage 276/277.

Since the opposite faces of the casing members 250, 251 are, before assembly, readily available for machining or filing or other work, it is possible for multi-stage pumps according to the present invention to be manufactured accurately and relatively inexpensively from castings or by fabrication as described with reference to FIGS. 3 and 4 for the internal surfaces thereof to be made smooth whereby to facilitate fluid flow.

The present invention enables a rotodynamic volute machine casing to be manufactured from a number of casing parts most of which and possibly all of which except for the inlet and discharge ducts can be of circular cross section in planes perpendicular to the axis of rotation. The invention therefore includes a rotodynamic volute machine casing which comprises inlet and discharge ducts and casing parts which are of exclusively circular cross section in planes perpendicular to the axis of rotation, and it furthermore includes a machine casing fabricated from such parts by welding.

The invention also includes a rotodynamic volute machine casing which comprises, and which may be fabricated from, casing parts which are exclusively of annular or circular cross section in planes perpendicular to the axis of rotation and which include coaxial extending inner and outer annular walls which have openings or gaps therein to receive inlet and discharge ducts.

A still further feature of the invention resides in a rotodynamic volute machine casing which comprises an axially extending outer casing wall of annular or circular cross section having a port therein and serving as the outermost peripheral boundary of the volute passage, an inner casing wall coaxial with the outer wall but of smaller girth and having a port therein, and a connecting wall extending from the outer wall to the inner wall so that said ports are on axially opposite sides thereof, said inner casing wall confining an inlet or discharge passage which communicates with the eye of the rotor and said outer casing wall and said connecting wall confining the rotor chamber.

The present invention furthermore includes a multi-stage volute pump casing which comprises a series of coaxial axially spaced impeller chambers each having at its outer periphery a volute passage of constant radial width and increasing axial depth, each of which passages except the last communicates at its wider end with a passage which continues smoothly therefrom outside of the diameter of the volute passage in a helical or axially inclined direction through a dividing wall between adjacent impeller chambers and then turns smoothly inwardly and enlarges in cross sectional area towards the inlet passage of the succeeding impeller casing. By the term "inlet passage" is meant an annular passage which leads to the rotor eye.

A further feature of the invention resides in a rotodynamic volute machine casing in which an annular rotor or flow chamber concentric with and surrounding the rotor space communicates through a substantially axially directed annular transfer passage with a volute passage which is axially spaced from the flow chamber. The circumferentially varying cross sectional area of the volute passage so spaced from the annular rotor chamber may result from a contoured volute bounding surface on a member which is inserted in the casing and which may be detachable from the casing or adjustable relatively thereto to enable the volume of the volute passage to be altered.

The casing cover may have an axially inwardly directed boss concentric with the casing and the boss may have an annular flange at or near its inner end serving to separate the rotor chamber from the volute passage and serving at its periphery to define the inner margin of the transfer passage.

In preferred forms of construction the rotor or flow chamber is located at the inner end of or continues from the inner end of an axially directed cylindrical bore in the machine casing, the open outer end of the bore being closed by a cover having an axially inwardly directed boss extending into the bore concentrically therewith which boss has an annular flange at or near its inner end serving to separate the rotor chamber from the volute passage and serving also at its periphery to define the inner margin of said transfer passage. The boss may be detachable from the cover and in some forms of construction it may close a central opening in the cover. The face of the boss which is directed axially away from the cover may be formed with a recess to receive an axially directed spigot on the impeller.

In said preferred forms of construction referred to immediately above the volute passage is located in an axially directed bore in the machine casing between a cover closing the bore and a flange on a boss extending axially inwardly from the cover. The gradually changing cross sectional area of the volute passage between the flange and the cover may result from a suitably shaped surface on the cover or on the flange or on both or from a suitably shaped surface on a member secured to the inner face of the cover or to the outer face of the flange facing the cover or from suitably shaped surfaces formed on the cover and on a member secured to the flange or vice versa or from a suitably shaped surface formed on a member surrounding the boss or from a suitably shaped surface formed on the inner face of an annular member located between the flange and cover and supported on and adjustable relatively to the cover. To change the volume of the volute passage spacing rings may be inserted or withdrawn from between the casing and the flange on the cover and spacing rings of equal thickness inserted or withdrawn from between the cover and the boss.

In some forms of construction the volume of the volute passage may be reduced by means of an annular space filling member fitting on and surrounding the boss between the flange and the cover.

I claim:

1. A rotodynamic volute machine comprising in combination:
    a rotor casing having a substantially cylindrical longitudinal bore therein of circular cross-section and open at one end thereof, the surface of said bore bounding an impeller chamber and a circumferentially extending volute passage;
    an impeller in said impeller chamber and journalled for rotation about an axis concentric with the axis of said bore, said impeller having an outer periphery and said bore surface having a portion spaced radially outwardly of said impeller periphery;
    an insert located in said bore;
    a contoured surface on said insert, bounding a side of said volute passage and imparting to said volute passage a circumferentially increasing cross-sectional area, a major portion of said contoured surface being spaced axially from said impeller periphery in a direction toward said open end of said bore; and
    means defining a portion of said volute and having a circular periphery of diameter at least as great as that of said impeller periphery, said circular periphery of said means being located co-axially with said rotary axis and axially between said impeller periphery and a major portion of said contoured surface on said insert, and said circular periphery of said means and said bore surface defining a restricted annular gap concentric with said rotary axis for the flow of fluid from said impeller periphery to said volute passage, said insert being adapted to be removed and replaced by other inserts to change the cross section of the volute to vary the discharge characteristics of the machine.

2. The rotodynamic volute machine as defined in claim 1 wherein the surface of said bore forms the outer wall of said impeller chamber.

3. The rotodynamic volute machine as defined in claim 2 wherein said contoured surface faces axially of said longitudinal bore.

4. The rotodynamic volute machine as defined in claim 1 including means to vary the position of said insert axially with respect to said impeller periphery.

5. A rotodynamic volute machine comprising in combination:
    a rotor casing having a substantially cylindrical longitudinal bore therein of circular cross-section and open at one end thereof, the surface of said bore bounding an impeller chamber and a circumferentially extending volute passage;
    an impeller in said impeller chamber and journalled for rotation about an axis concentric with the axis of said bore, said impeller having an outer periphery and said bore surface having a portion spaced radially outwardly of said impeller periphery;
    an insert having concentric external and internal cylindrical surfaces located in said bore;
    an axially directed contoured surface on said insert, bounding a side of said volute passage and imparting to said volute passage a circumferentially increasing cross-sectional area, a major portion of said contoured surface being spaced axially from said impeller periphery in a direction toward said open end of said bore; and
    a cover having an external cylindrical surface of diameter at least as great as that of said impeller periphery thereon complementary to said internal cylindrical surface on said insert and defining a portion of said volute, said cover being fitted in said insert with said external cylindrical surface on said cover extending axially inwardly of said bore beyond at least a major portion of said contoured surface and defining with said bore surface restricted annular gap concentric with said rotary axis for the flow of fluid from said impeller periphery to said volute passage, said insert being adapted to be removed and replaced by other inserts to change the cross section of the volute to vary the discharge characteristics of the machine.

6. The rotodynamic volute machine as defined in claim 5 wherein said longitudinal bore in said rotor casing is cylindrical throughout its length, and said external cylindrical surface is complementary to the cylindrical surface of said bore.

7. The rotodynamic volute machine as defined in claim 6 wherein said insert has an outwardly extending circumferential flange outside said bore, and said cover has an outwardly extending flange overlying said flange.

8. A rotodynamic volute machine comprising in combination:
    a rotor casing having a substantially cylindrical longitudinal bore therein of circular cross-section and open at one end thereof, the surface of said bore bounding an impeller chamber and a circumferentially extending volute passage;
    an impeller in said impeller chamber and journalled for rotation about an axis concentric with the axis of said bore, said impeller having an outer periphery and said bore surface having a portion spaced radially outwardly of said impeller periphery;

a cover assembly inserted in the open end of said bore;

a contoured surface on said cover assembly, bounding a side of said volute passage and imparting to said volute passage a circumferentially increasing cross-sectional area, a major portion of said contoured surface being spaced axially from said impeller periphery in a direction toward said open end of said bore; and a radially outwardly extending interior flange on said cover assembly defining a portion of said volute and having a circular periphery of diameter at least as great as that of said impeller periphery, said interior flange being located concentrically with said rotary axis and axially between said impeller periphery and said contoured surface on said cover assembly, and said circular periphery of said flange and said bore surface defining an annular gap concentric with said rotary axis for the flow of fluid from said impeller periphery to said volute passage, said cover assembly adapted to be removed and replaced by other cover assemblies having different contoured surfaces thereon to change the cross section of the volute to vary the discharge characteristics of the machine.

9. The rotodynamic volute machine as defined in claim 8 wherein the surface of said bore forms the outer wall of said impeller chamber.

10. The rotodynamic volute machine according to claim 9 wherein said contoured surface faces axially of said longitudinal bore.

11. A rotodynamic volute machine casing comprising a hollow cylindrical outer casing wall, an inner cylindrical casing wall co-axial with the outer wall but of smaller girth, an annular connecting wall extending from the outer wall to the inner wall, insert means in said outer casing wall and in part delimiting a volute passage in said outer casing wall at one side of said connecting wall, surface means on said insert means shaped to at least in part impart to said volute passage a cross sectional area which increases circumferentially from an end of smaller cross section to an end of larger cross section, a port through said outer casing wall communicating with said volute passage end of larger cross section, and a port through said inner casing wall at the opposite side of said annular connecting wall to said volute passage.

References Cited by the Examiner

UNITED STATES PATENTS

| 705,347 | 7/02 | Harris | 103—103 |
|---|---|---|---|
| 765,969 | 7/04 | Hanson | 103—103 |
| 2,381,834 | 8/45 | Meredew et al. | 103—87 |
| 2,927,536 | 3/60 | Rhoades | 103—97 |
| 2,978,989 | 4/61 | Lung | 103—108 |
| 3,007,417 | 11/61 | Feltus | 103—96 |
| 3,037,458 | 6/62 | Olmstead et al. | 103—114 |

FOREIGN PATENTS

| 110,760 | 6/40 | Australia. |
|---|---|---|
| 578,473 | 6/39 | Canada. |
| 886,545 | 7/43 | France. |
| 505,660 | 8/30 | Germany. |
| 285,335 | 2/28 | Great Britain. |
| 341,305 | 1/31 | Great Britain. |
| 613,892 | 12/48 | Great Britain. |
| 785,419 | 10/57 | Great Britain. |
| 509,572 | 1/55 | Italy. |

JOSEPH H. BRANSON, Jr., *Primary Examiner.*

LAURENCE V. EFNER, *Examiner.*